TELEMETERING OSCILLATORS

Filed May 1, 1952 4 Sheets-Sheet 1

INVENTORS
EDWARD L. TARCA
FRANCIS A. VARALLO
BY
Woodcock and Phelan

*INVENTORS*
EDWARD L. TARCA
FRANCIS A. VARALLO
*BY*
Woodcock and Phelan

TELEMETERING OSCILLATORS

Filed May 1, 1952 4 Sheets-Sheet 3

INVENTORS
EDWARD L. TARCA
FRANCIS A. VARALLO
BY
Woodcock and Phelan

May 22, 1956 E. L. TARCA ET AL 2,747,093

TELEMETERING OSCILLATORS

Filed May 1, 1952 4 Sheets-Sheet 4

*INVENTORS*
EDWARD L. TARCA
FRANCIS A. VARALLO

*BY* Woodcock and Phelan 2,747,093

TELEMETERING OSCILLATORS

Edward L. Tarca, Lansdowne, and Francis A. Varallo, Philadelphia, Pa., assignors to Raymond Rosen Engineering Products, Inc., Philadelphia, Pa., a corporation of Pennsylvania Application May 1, 1952, Serial No. 285,402

21 Claims. (Cl. 250—36)

This invention concerns frequency-modulated oscillators and particularly relates to oscillator systems used in telemetering for producing a sub-carrier which is frequency-modulated in accordance with the variations of a condition such as deflection, pressure, temperature, airspeed, acceleration or the like.

In accordance with the present invention, frequency-modulation of an oscillator is effected by varying the amplitude of a signal voltage of oscillator frequency by or in accordance with the information or intelligence to be transmitted and then applying such signal, after amplification if necessary, in predetermined phase-relation to the excitation voltage of the oscillator so that the vector sum of these voltages varies in accordance with the information and so correspondingly varies the oscillator frequency. In general, the invention is applicable to any oscillator having a resonant circuit or element or any oscillator of the phase shift type, as distinguished from a multivibrator or relaxation type oscillator, and involves deriving a signal of oscillator frequency, transmitting the signal through a path including a phase-shift network and impedance varied in accordance with desired information and then applying this signal of oscillator frequency to a tube whose output appears across a reactive element which, in part, determines the frequency of oscillation.

More particularly, in accordance with the present invention, impedance means included in or coupled to the oscillator comprises a network including one or more impedances responsive to the change in magnitude of the condition under measurement. The oscillator-frequency output of such network, preferably after amplification, is transmitted through a phase-determining network and vectorially added to the oscillator-feedback voltage to determine the instantaneous frequency of the generated oscillations, the frequency varying over a range corresponding with the range of response of the conditoin-responsive impedances to the changes in magnitude of the measured condition.

More specifically, the preferred sub-carrier oscillator of a telemetering transmitter is a cathode-coupled oscillator and the condition-responsive network is included in the cathode circuit to provide the feedback voltage for sustained generation of oscillations as well as the information voltage which, after amplification, is vectorially added in predetermined phase-relation to the feedback voltage as applied to another electrode of the oscillator.

More specifically, the aforesaid amplifier is a negative feedback amplifier provided with a negative feedback control whose setting determines the width of the band through which the oscillator-frequency is varied in response to changes in the measured variable. Also the invention includes control means, such as an adjustable impedance, to vary the location of the frequency spectrum of the band through which the oscillator-frequency is varied.

Preferably, the condition-responsive network comprises a bridge having a condition-responsive impedance in at least one arm to provide an output signal varying in accordance with the measured condition: preferably condition-responsive impedances are included in at least one pair of bridge arms to minimize variation of the positive feedback voltage with changes in magnitude of the measured condition.

Further in accordance with the invention, the frequency/attenuation characteristic of a filter provided in the output circuit of the oscillator to minimize harmonic distortion is such that it also compensates for the frequency/amplitude characteristic of the oscillator, so to obtain substantial constancy of the amplitude of the filtered output of the oscillator over the range of its frequency-modulation.

The invention further resides in features of combination and arrangement hereinafter described and claimed.

For a more complete understanding of the invention, reference is made to the accompanying drawings in which:

Fig. 1 schematically illustrates a cathode-coupled oscillator system embodying a preferred form of measuring network;

Figure 6:
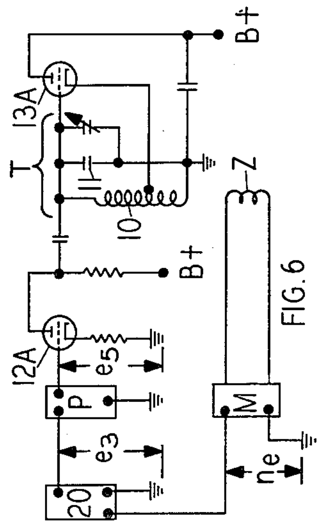
Figure 7:
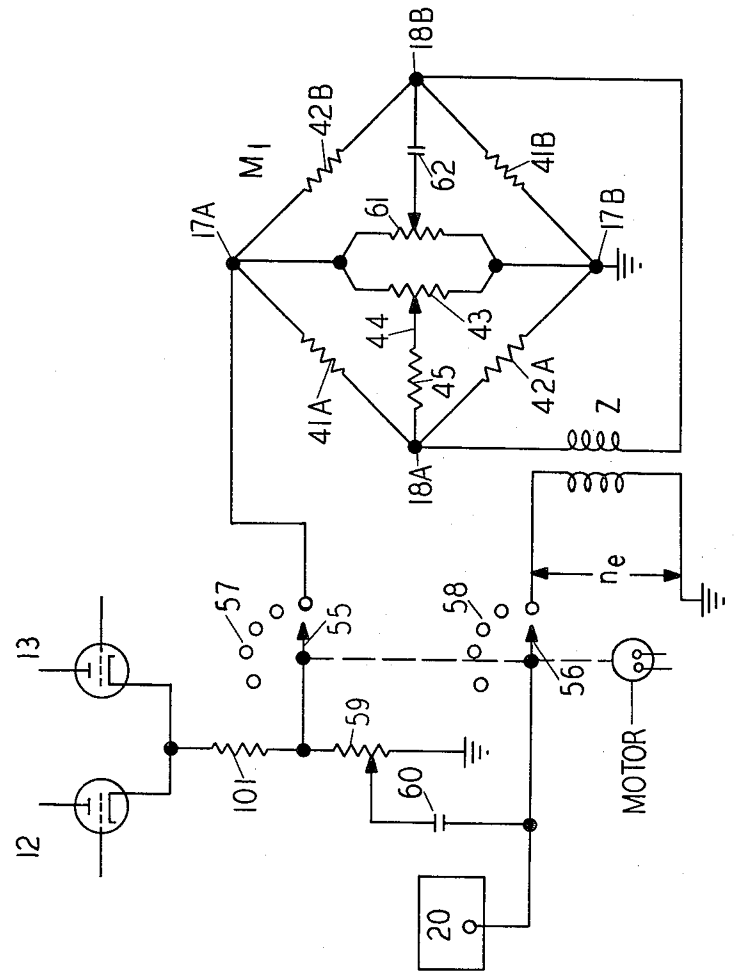

Fig. 6 schematically illustrates the invention as applied to a Hartley oscillator; and Fig. 7 schematically illustrates an arrangement in which a plurality of measuring networks are included in the oscillator system by commutation.

Figure 1:
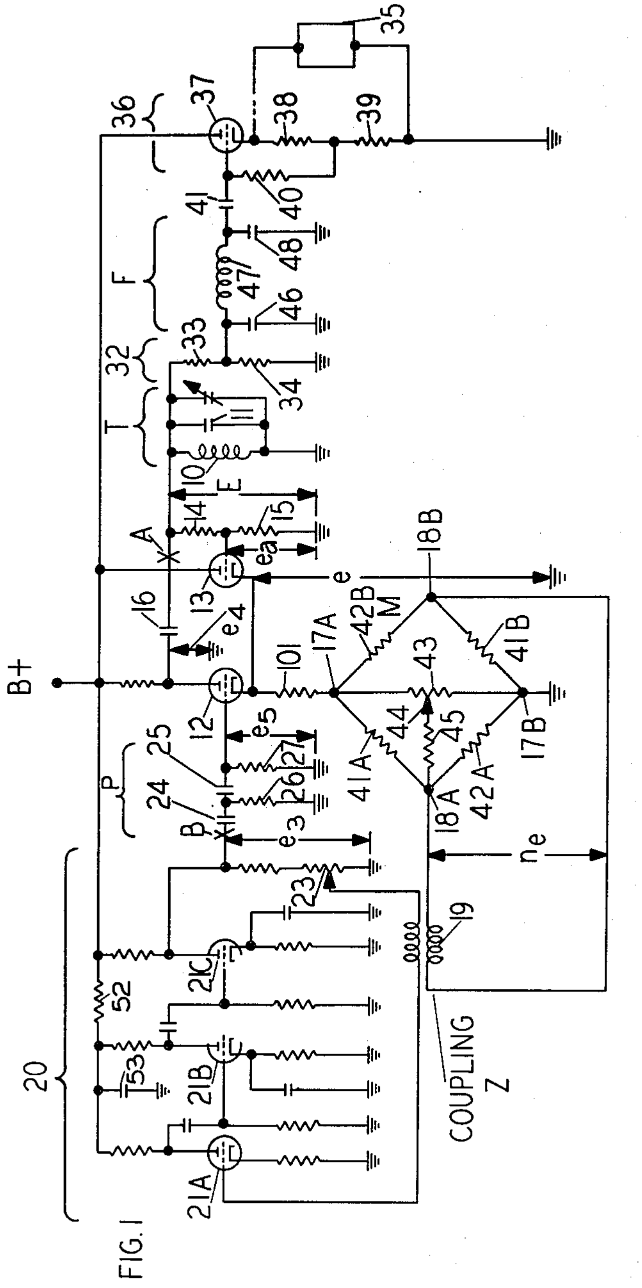

Referring to Fig. 1 as exemplary of a system utilizing the invention, the resonant circuit T comprising inductance 10 and capacitor 11 is the tank circuit of a cathode-coupled oscillator comprising triodes 12, 13 in the same or different envelopes. So far as the oscillator-frequency voltage E developed across the tank circuit is concerned, the anode of tube 13 is at ground potential: the oscillator-frequency voltage $e_a$ on the grid of tube 13 is a fraction of that appearing at the tank circuit terminals which fraction is determined by a potential divider comprising resistors 14, 15. The cathodes of tubes 12, 13 are connected together, the common cathode circuit of the tubes including a network M, which, as later described, includes impedances varied in response to changes in magnitude of a condition such as deflection, temperature, pressure or the like. The grid of tube 12 is connected to the ground side of network M, through resistor 27, so that the voltage $e$ of oscillator-frequency between the cathodes and ground is amplified by tube 12 and fed back through blocking condenser 16 to the tank circuit.

As thus far described, the only signal voltage applied to tube 12 is the positive feedback voltage $e$ necessary for production of oscillations of fixed base frequency primarily determined by the constants of the tank circuit T.

There is applied to the grid of tube 12 a second voltage of oscillator-frequency derived from network M whose phase is essentially reactive with respect to the signal on the tank T, the amplitude of this second voltage being varied in accordance with the intelligence to be transmitted.

There is a signal on the grid of tube 12 even in the absence of any signal there which is derived from network M: it is due to grid current flowing in this tube as a result of normal oscillating voltages. This signal is mixed at the grid with the signal coming from network M. The two signals are approximately 90° out-of-phase so that a change in the amplitude of the signal derived from network M changes the phase of the combined signal as later discussed in connection with Fig. 4.

The major effect of a change in the condition-responsive network M is to change the reactive component on the grid of tube 12. The magnitude of the reactive component on the grid of tube 12 controls the amount of reactance injected across the tank T by tube 12 thereby effecting frequency-modulation of the oscillator. Because the frequency-modifying signal is applied to tube 12 of the oscillator, that tube for clarity of explanation is often hereinafter referred to as the "modulator" tube, although as appears from the preceding explanation it is also an essential tube of the particular basic oscillator circuit shown in Fig. 1.

In the particular form shown in Fig. 1, the network M is a bridge whose input terminals 17A, 17B are respectively connected to the cathodes of oscillator tubes 12, 13 through resistor 101 and to an electrical ground point. The output terminals 18A, 18B of the bridge are connected by transformer 19, or other coupling device or network, to the input circuit of a voltage amplifier 20. The coupling transformer 19 is preferably of the step-up type to afford additional voltage gain. The amplifier 20 is an amplifier having high negative feedback to maintain a high degree of consistancy of gain and phase shift through at least the range of frequencies covered by the oscillator.

In the particular form shown in Fig. 1, the amplifier 20 is a three-stage resistance-coupled amplifier comprising tubes 21A, 21B, 21C with the usual plate and grid circuit resistors and coupling condensers. The anode circuit of the first two stages preferably includes a decoupling network comprising resistor 52 and capacitor 53. The amount of negative feedback may be varied or adjusted by potentiometer resistor 23 in the output circuit of the last tube 21C: as later appears, the width of the frequency-modulation band of the oscillator may be preset by this control device or equivalent.

The output of amplifier 20 is impressed upon the grid of modulator tube 12 through a phase-determining network P comprising in the example shown the capacitors 24, 25 and resistors 26, 27. In the conventional cathode-coupled oscillator, the grid of tube 12 would be connected directly to ground whereas in Fig. 1 the resistor 27, or equivalent output impedance of the phase-determining network, intervenes for application to the grid of a second voltage of oscillator-frequency derived from network M.

For reduced harmonic distortion, the relative values of the resistors 14, 15 is preferably such that the positive feedback voltage $e_a$ applied to the grid of oscillator tube 13 is slightly higher than the minimum value required for sustained generation of oscillations. However, considerations of stability and sensitivity require circuit values which result in harmonic distortion too high to be tolerated, for example, in precise telemetering applications. Although tank circuit 10, 11 is frequency-selective, its rejection of harmonics is not sufficient for the purity of waveform output required in many telemetering applications, particularly those involving multiplexing, as in copending application Serial No. 189,582 upon which Letters Patent 2,592,737 has been issued. Substantially to eliminate the harmonic distortion, the tank circuit T is followed by a filter F which may be, as shown, a single $\pi$ section formed by capacitors 46, 48 and inductance 47.

Attenuation of the filter F increases with frequency but its output voltage is maintained substantially constant over the range of frequency variation of the oscillator by so selecting the constants of the phase-determining network P that the tank voltage E increases with frequency.

The voltage-divider 32 comprising resistance 33, 34 reduces the loading effect of filter F upon the tank circuit T.

The output filter F is coupled to a utilization circuit or device 35, such as a calibrated frequency-responsive device or the mixer of a multiplex transmitter as in the aforesaid copending application Serial No. 189,582, now Patent 2,592,737, by a cathode follower stage 36 comprising tube 37. Cathode resistors 38, 39 and the grid resistor 40 connected between their common terminal and the grid of tube 37 are of such values that the input impedance of the cathode follower stage is very high, in the order of 8 megohms. The capacitor 41 is a blocking condenser to preserve the proper bias for the grid of tube 37; except for it the bias would be destroyed by shunt paths through preceding networks.

Reverting to network M for further discussion of its function: when deflection is the variable to be measured, one or more of resistors 41A, 41B, and/or 42A, 42B are strain-gages physically attached to the structural element, such as an airplane wing or strut, under test. The voltage *ne* appearing between the output terminals of network M is therefore a variable fraction of the oscillator-frequency voltage applied to the input terminals 17A, 17B of the network, the voltage *ne* varying in dependence upon the existing deflection and producing a corresponding change of the oscillator frequency. To change the location, in the frequency spectrum, of the range through which the oscillator-frequency is varied for a given range of variation of the condition-sensitive resistors of network M, there is provided a potentiometer 43 connected between the input terminals 17A, 17B of network M. The movable contact 44 of the potentiometer is connected, through resistor 45, to one of the output terminals of the network, so that adjustment of contact 44 varies the output *ne* for a given magnitude of the measured condition. Such arrangement for shifting the balance point of the bridge has the advantage of only inappreciably affecting the bridge sensitivity. This is one suitable way of varying the location in the frequency spectrum of the range of frequency over which the oscillator-frequency is varied in response to the measured variable. The resistance of potentiometer 43 is high compared to the impedance of the other paths between the input terminals 17A, 17B, for example, the resistance of potentiometer 43 may be of the order of 30,000 ohms, when the resistance of each of the bridge arms is in the order of a few hundred ohms. Resistor 45 is included so that the change in setting of potentiometer has no appreciable effect upon the width of the modulation band. A suitable value of resistance for resistor 45 is 10,000 ohms in the specific arrangement described.

In practice, all of the oscillator-system components of Fig. 1, except the condition-responsive impedances of network M, may be housed to form a small, electrically-shielded, temperature-compensated unit.

A better understanding of the frequency-modulation may be had by consideration of the following vectorial analysis of a strain-gage oscillator system of Fig. 1 as used with the controls set for variation of the oscillator-frequency over a $\pm 7.5\%$ band, with respect to a center frequency, for a bridge sensitivity of 5 millivolts per volt, unterminated.

Figure 2A:
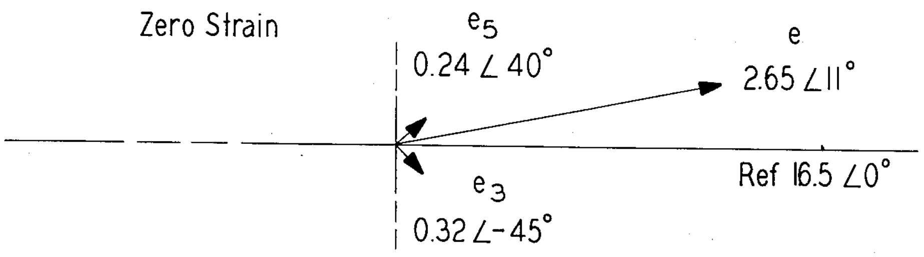
Figs. 2A–2C, 3A–3B and 4 are explanatory figures referred to in discussion of frequency-modulation of the oscillator of Fig. 1.
Figure 2B:
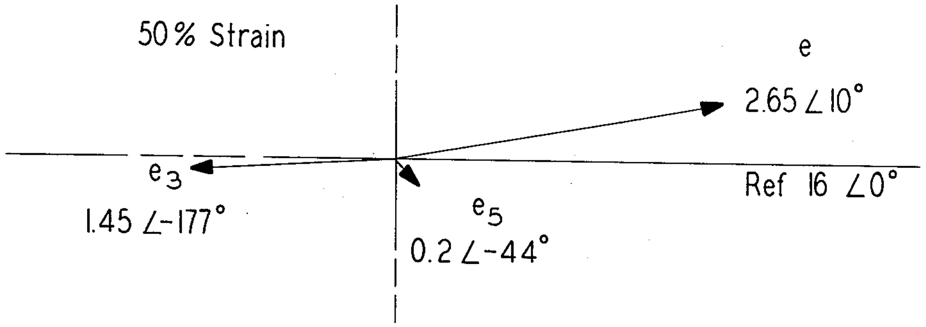
Figure 2C:
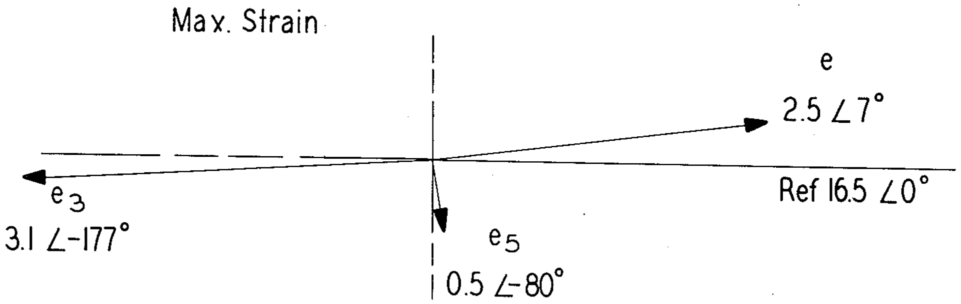

Using the tank voltage E as the reference, the phase relations of the oscillator cathode voltage *e*, the amplifier voltage $e_3$, and the grid voltage $e_5$ of the oscillator-modulator tube 12 were determined for zero strain (Fig. 2A), for 50% strain (Fig. 2B), and for maximum strain (Fig. 2C). The amplitudes and phase angles of these voltages are indicated in Figs. 2A–2C.

To determine the normal oscillator component of the voltage upon the anode of tube 12, the connection of the tank circuit was broken at point A and the connection from the amplifier 20 to the phase-determining network 23 was broken at point B. A simulated oscillator signal was fed directly to the grid of oscillator tube 13. The voltage *e* of the cathodes (Fig. 3A) is approximately in phase with this applied voltage. The resulting voltage $e_4$ (Fig. 3A) appearing upon the anode of the modulator tube 12 was found to lag the input cathode voltage by 9 degrees and the resulting voltage $e_3$ at the input of the phase-determining network was found to lag by 175 degrees. As apparent from the relation of the voltages *e* and $e_4$, the absolute magnitude of the cathode circuit gain of this stage is 10. In this manner, the amplitude and phase-relationships between a voltage of oscillator-frequency on the cathode and the resulting positive feedback voltage on the anode was established.

To ascertain the relationships affecting the second component of the anode voltage of the modulator tube: with the connection still broken at points A and B, a simulated amplifier output signal $e_3$ was fed directly into the phase-determining network at point B. The resulting voltage $e_5$ (Fig. 3B) appearing at the grid of tube 12 leads the voltage $e_3$ by 50 degrees and the resulting voltage $e_4$ (Fig. 3B) appearing at the anode of tube 12 is substantially greater than and lags the voltage $e_5$ by 175 degrees. From these measurements, it is also evident that the absolute magnitude of the grid circuit gain of the particular modulator stage is 15.9. As above explained, it is this second component of the anode voltage of tube 12 which is varied in accordance with the condition under measurement correspondingly to vary the frequency of the generated oscillations.

Figure 3B:
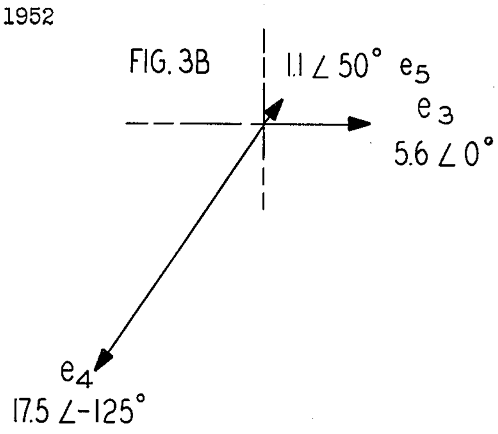
Figure 3A:
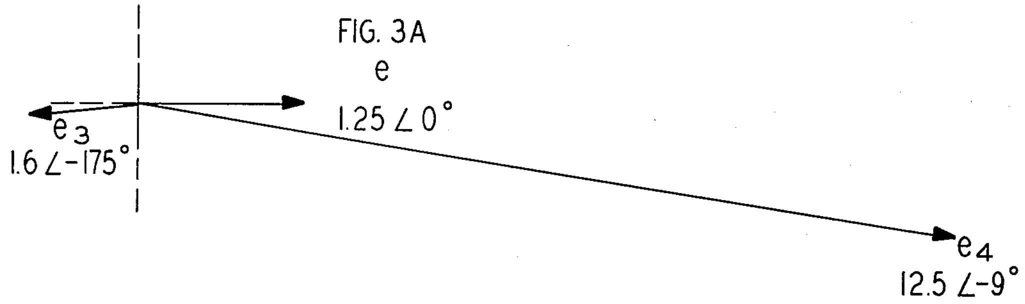

Applying the data of Figs. 3A, 3B to that obtained with normal circuit operation (Figs. 2A–2C), the vector diagrams (Fig. 4) for zero, 50%, and maximum strain were obtained.

For example, with 100% strain, the cathode voltage $e$ of tubes 12, 13 is 2.5 volts at +7° with respect to the tank voltage (Fig. 2C): the corresponding component CZ of the anode voltage of tube 12 is 25 volts at −2° (Fig. 4), the cathode circuit gain being 10, as above stated. The signal $e_5$ on the grid of tube 12 is 0.5 volt at −80° (Fig. 2C): the corresponding component GZ of the anode voltage of tube 12 is 7.95 volts at +105 degrees (Fig. 4), the grid circuit gain being 15.9, as above stated. The vector sum Z (Fig. 4) of these two voltages shows the magnitude and phase of the resultant voltage upon the anode of tube 12 for 100% strain.

By the same procedure, the magnitude and phase of the anode voltage of tube 12 for zero and 50% strain was determined. Specifically for zero strain, the first component CX is 26.5 volts at +2°, and the second component GX is 3.8 volts at −135°. Thus, vector X (Fig. 4) represents the anode voltage of tube 12 for zero strain. For 50% strain, the first component CY is 26.5 volts at +1°; and the second component GY is 3.18 volts at 141°; thus vector Y represents the anode voltage of tube 12 for 50% strain.

The angle $\alpha$ between the vectors X and Z represents the full selected band width of 15%; vector Y bisecting $\alpha$, being at the center frequency of the band.

Figure 4:
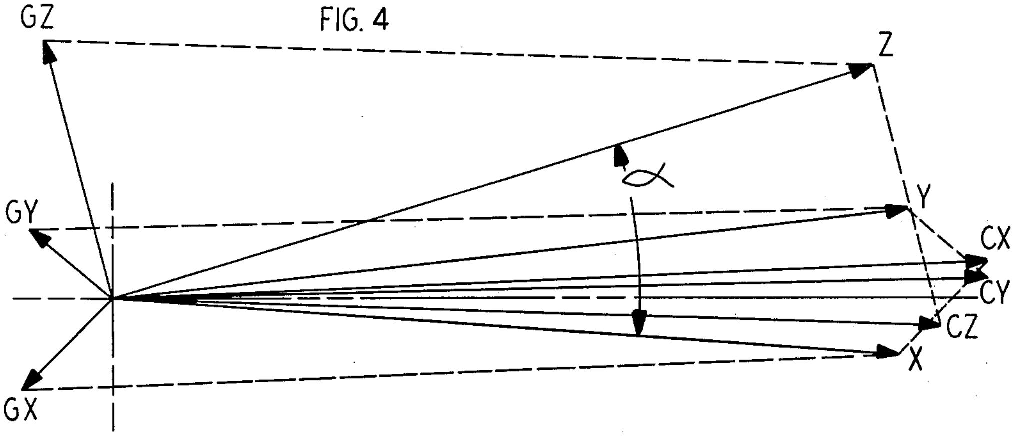

The normal unmodulated frequency of the oscillator as determined by its tank circuit 10, 11 corresponds with the horizontal axis of Fig. 4; i. e., in the particular arrangement shown the network M is in balance and its output voltage *ne* is zero for an intermediate finite value of the measured variable.

In a multiplex system there may be several such cathode-coupled oscillators, each frequency-modulated by a condition-responsive network such as M.

Each of the different oscillators may, as in Fig. 1, have a strain-gage bridge M in its cathode circuit so that the instantaneous frequency of the oscillators each corresponds with the strain to which a selected part of an airplane, for example, is subjected at a particular time. Alternatively, the cathode network of any of the oscillators may include an impedance variable in accordance with some other condition, such as temperature, pressure or the like.

For example in Fig. 1, one or more of the resistors 41A, 41B, 42A, 42B may be of conductor having a substantial temperature coefficient of resistance so that the signal voltage *ne* supplied to amplifier 20 varies as a function of temperature. In such cases, if the temperature-sensitive resistors are in adjacent bridge arms, their temperature coefficients should both be positive or negative: if they are in opposite arms, the temperature coefficient of one should be positive and the temperature coefficient of the other should be negative. The reactive component of the anode current of tube 12 varies with respect to the normal positive feedback component in accordance with temperature, and accordingly the output-frequency of the oscillator varies as a function of temperature.

Figure 5B:
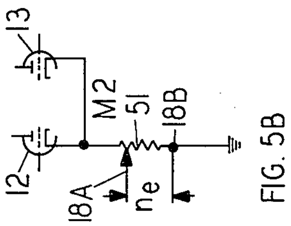
Figs. 5A and 5B illustrate modifications of the measuring network of Fig. 1.
Figure 5A:
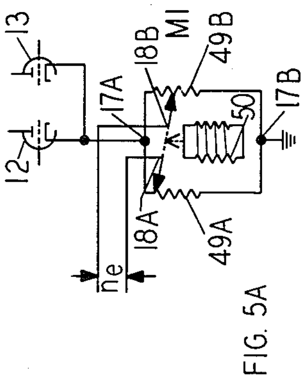

For measurement of pressure, the strain-gage elements of network M may be stressed by a pressure-responsive device, or, as shown in Fig. 5A, the network M may be replaced by a network $M_1$ comprising two potentiometer resistors 49A, 49B connected in shunt to each other between the cathodes of oscillator tubes 12, 13 and ground. The two movable contacts of the potentiometers are coupled for movement in unison in opposite electrical directions by a pressure-responsive device generically represented by the bellows or diaphragm 50. Thus as in Fig. 1, the signal voltage *ne* derived from the cathode network $M_1$ varies as a function of the measured condition and correspondingly varies one component of the oscillator-frequency anode-current of tube 12.

Alternatively, as shown in Fig. 5B, the network M of Fig. 1 may be replaced by a network $M_2$ in which the position of the movable contact of resistor 51 is governed by any varying function that can be converted to mechanical movement suitable for controlling the position of movable contact such as air speeds, pressure, acceleration or the like, so that the signal voltage *ne* for exciting the amplifier 20 of Fig. 1 again varies as a function of the condition selected to vary the oscillator-frequency. If desired, the location in the frequency spectrum of the range of frequency covered by the oscillator may be controlled by using a trimmer capacitor or a slug-tuned inductor in the tank T. The width of the frequency band is controlled by adjustment of resistor 23, Fig. 1.

The invention is not limited to frequency-modulation of cathode-coupled oscillators and is generally applicable to all oscillators of type having a resonant circuit or element primarily determinative of the frequency of the generated oscillations or any oscillator of the phase shift type. For example in Fig. 6, there is shown application of the invention to a Hartley oscillator comprising tube 13A. The resonant tank circuit T is connected between the grid and anode of tube 13A and the cathode of tube 13A is connected to a suitable intermediate point of the tank inductance 10 to apply a suitable fraction of the voltage developed across the tank circuit to the grid as its excitation voltage.

The condition-responsive network M is suitably coupled to the oscillator, as by coupling coil Z or equivalent, to derive therefrom a voltage *ne* of oscillator-frequency whose amplitude is varied in accordance with the measured variable, or other information. This signal is amplified by amplifier 20 as above described, transmitted through phase-determining network P and applied to the grid of 12A, as shown, or directly to the grid of 13A. In either case, the signal voltage containing the information is vectorially added to the excitation voltage of the same frequency at the grid of the oscillator tube to effect frequency-modulation as described in connection with the previous figures.

In multiplex telemetering, such as disclosed, for example, in aforesaid copending application, Serial No. 189,582, now Patent 2,592,737, the outputs of a plurality of condition-responsive networks may be repeatedly sequentially sampled so that each in turn determines the instantaneous frequency of the sub-carrier oscillator. Such sampling may be effected by a suitable commutator, such as shown in copending application Serial No. 146,504, upon which Letters Patent 2,634,342 has issued, represented in Fig. 7 by the motor-driven contacts 55, 56 and the banks of fixed contacts 57, 58 respectively associated therewith.

The fixed contacts 57 are input terminals for a corresponding number of measuring networks $M_1$ and the fixed contacts 58 are output terminals of those networks. For clarity, only one of the measuring networks is shown but it shall be understood the remainder have input and output terminals similarly connected to successive pairs of contacts 57, 58.

In Fig. 7, the cathode circuit of the oscillator is modified, as by inclusion of potentiometer 59 and coupling capacitor 60, continuously to supply to amplifier 20 a reference voltage of oscillator frequency which is effective during the commutation to establish a base or reference frequency for the off-time of a break-before-make commutator. The sampled output voltage from each of the condition-responsive networks is additive to such reference voltage so that the instantaneous frequency of the oscillator as measured in successive samplings varies in accordance with changes in magnitude of the corresponding measured condition.

To facilitate matching of the reactive balance points of the measuring networks, each is provided as shown in Fig. 7 with a potentiometer 61 connected between the input terminals and a reactance, exemplified by capacitor 62, connected between the adjustable contact of the potentiometer and output terminal 18B of the network.

From these specific examples and from the discussion of the principles involved, the adaptation of the invention to specifically different oscillators will be apparent to those skilled in the art.

What is claimed is:

1. A frequency-modulated oscillator for stably generating oscillations whose frequency varies in accordance with changes in magnitude of a measured condition comprising a cathode-coupled oscillator, resonant means included in said oscillator and primarily determining the frequency of the generated oscillations, impedance means inclusive of said frequency-determining resonance means and having a pair of terminals respectively connected to the oscillator cathode and to a point common to the grid and cathode circuits of the oscillator to provide a first feedback voltage, itself providing for sustained generation of oscillations at a base frequency corresponding with resonance of said resonant means and with a predetermined magnitude of said condition, said impedance means including a potential-divider network comprising resistance means whose resistance is varied in response to changes of said measured condition from said predetermined magnitude thereof to provide a second voltage of oscillator frequency and of magnitude varying in accordance with said changes in magnitude of said measured condition, means including an amplifier and a phase-determining network for applying said second voltage to said oscillator, the vector sum of said first feedback voltage and said second applied second voltage determining the frequency of the generated oscillations throughout a range corresponding with the range of response of said potential-divider network and including said base frequency.

2. An arrangement as in claim 1 in which the amplifier is a negative-feedback amplifier provided with means for adjusting the negative feedback thereby to vary the width of the range through which the oscillator-frequency is varied for the range of variation of said second voltage by response of said network to said changes in magnitude of said condition.

3. An arrangement as in claim 1 in which impedance means in the oscillator cathode circuit is adjustable to shift the location in the frequency spectrum of the range through which the oscillator-frequency is varied for the range of variation of said second voltage by response of said network to said changes in magnitude of said condition.

4. An arrangement as in claim 1 in which the amplifier is provided with an adjustable negative feedback control for setting the width of the range through which the oscillator-frequency is varied for the range of response of said network and in which said impedance means in the cathode circuit includes an impedance adjustable to preset the location of said frequency range in the frequency spectrum.

5. An arrangement as in claim 1 in which the potential-divider network is a bridge having a second pair of terminals between which said second voltage appears, said bridge having condition-responsive means in at least one pair of opposite arms to minimize variation of the feedback voltage between said first pair of terminals over the range of variation of the second voltage between said second pair of terminals.

6. An arrangement as in claim 5 in which a potential-dividing impedance is connected between the first pair of terminals of the bridge with a connection from the adjustable element of said impedance to one of the second pair of terminals of the bridge, the setting of said element determining the location in the frequency spectrum of the range through which the oscillator-frequency is varied by the response of condition-responsive means.

7. An arrangement as in claim 1 in which the output circuit of the oscillator includes a filter for reduction of harmonic distortion and whose circuit constants compensate for the frequency/attenuation characteristic of the phase-determining network so to maintain substantial constant amplitude of the filtered output through the range of frequency of the generated oscillations.

8. A frequency-modulated oscillator for stably generating oscillations of frequency corresponding with the varying magnitude of a condition comprising two triodes, a network in the common cathode circuit of said triodes and including impedance means responsive to variations of said condition, a tank circuit connected between the anode of one of said triodes and said network, a connection from the grid of said triode to said network for deriving therefrom a feedback voltage sustaining generation of oscillations, said connection including resistance means, a phase-determining network including said resistance means as its output element, a potential-dividing resistor in shunt to said tank circuit, a connection from the grid of the other of said triodes to a point on said potential-dividing resistor of potential but slightly higher than required for sustained generation of oscillations, and a linear negative feedback amplifier connected between said networks to apply to said grid of said one of the triodes a voltage whose phase relation to the feedback voltage thereon varies as a function of the magnitude of said condition, the vector sum of said voltages determining the frequency of the generated oscillations in correspondence with each magnitude of said condition.

9. A frequency-modulated oscillator as in claim 8 in which the cathode-circuit network includes condition-responsive impedances connected in said network to maintain constant input impedance thereof despite variation of said impedances so to maintain substantial constancy of the feedback voltage on said grid of said one of the tubes throughout the range of variation of the second voltage applied to that grid.

10. A frequency-modulated oscillator as in claim 8 in which the amplifier includes means for adjusting the negative feedback so to vary the range through which the oscillator-frequency is varied for the range of response of the condition-responsive impedance means of said cathode-circuit network.

11. A frequency-modulated oscillator as in claim 8 in which the cathode circuit network additionally includes resistance means adjustable to vary the location in the frequency spectrum of the range through which the oscillator-frequency is varied for the range of response of said condition-responsive means.

12. A frequency-modulated oscillator as in claim 8 in which the phase-corrective network has a falling frequency/attenuation characteristic and in which a filter in the output circuit of the oscillator attenuates harmonics of the generated oscillations and has a rising frequency/attenuation to obtain substantially constant amplitude of the filtered output throughout the range of variation of the oscillator-frequency.

13. A cathode-coupled oscillator comprising two tubes having in their common cathode circuit a constant input impedance network providing a positive feedback voltage applied to the grid of one of said tubes for sustained generation of oscillations, a negative feedback amplifier and a phase-corrective network connected between said cathode circuit network and said grid to provide a second voltage applied to said grid, the vector sum of said voltages determining the frequency of said generated oscillations, and means for varying the output of said cathode-circuit network as impressed upon said amplifier so to vary the phase of said second voltage with insubstantial change in phase or amplitude of the positive feedback voltage.

14. A cathode-coupled oscillator comprising two tubes, a four-terminal impedance network having input terminals respectively connected to the cathodes of said tubes and to the grid of one of them so to apply a positive feedback voltage to said grid, a negative feedback amplifier coupled to the output terminals of said cathode-circuit network, a phase-corrective network connected between the output of said amplifier and said grid to apply to said grid a second voltage derived from said cathode-circuit network, the vector sum of said voltages determining the frequency of the generated oscillations, and means for complementarily varying impedances of said cathode-circuit network to vary the voltage between its output terminals with concurrent insubstantial variation of its input impedance so substantially to vary the phase of said second voltage and negligibly to vary the phase and amplitude of the positive feedback voltage.

15. A frequency-modulated oscillator system comprising an oscillation generator including an oscillator tube and an associated resonant element primarily determining the frequency of the generated oscillations, means for deriving from the generated oscillations a signal having the same frequency, means responsive to information to be transmitted for varying the amplitude of said signal, and a phase-determining network interposed between said responsive means and said oscillation generator for applying the signal to said oscillator tube in predetermined phase relation to the normal signal supplied thereto from said resonant circuit element in a path excluding said network so to effect variation of the frequency of the generated oscillations in accordance with the information.

16. A frequency-modulated oscillator system as in claim 15 in which an amplifier is in circuit with said network between said responsive means and said oscillation generator, said amplifier being of negative feedback type and including control means for setting the negative feedback in determination of the range of variation of the oscillator-frequency for the range of response of said responsive means.

17. A frequency-modulated oscillator as in claim 8 in which the cathode-circuit network is a bridge having its input terminals respectively connected to a point common to the cathodes of said triodes and to a point common to the grid and anode circuits of said triodes, and having its output terminals connected to coupling means in the input circuit of said negative feedback amplifier.

18. A frequency-modulated oscillator for stably generating oscillations of frequency corresponding with the varying magnitude of a condition comprising tubes each having a grid, an anode and a cathode, a feedback network having one terminal connected to the cathodes of said tubes and a second terminal connected to a point common to the anode and grid circuits of said tubes, said network including impedance means responsive to variations of said condition, a resonant tank circuit connected between said point and the anode of one of said tubes, a phasing-network having an output element connected between said point and the grid of said one of said tubes, a connection from the grid of the other of said tubes to a point of potential intermediate that of the tank circuit terminals, and a negative feedback amplifier having its input circuit connected to said feedback network and its output circuit connected to the input circuit of said phasing-network.

19. A frequency-modulated oscillator as in claim 18 in which said negative feedback amplifier includes means for varying its negative feedback so to expand or contract the frequency-modulation band for a given range of variation of said condition without appreciably shifting the center frequency.

20. A frequency-modulated oscillator as in claim 18 in which said feedback network is a bridge having a second pair of terminals connecting to the input circuit of said negative feedback amplifier.

21. A frequency-modulated oscillator as in claim 20 in which a high-resistance potentiometer is connected between the first pair of terminals of the bridge with its adjustable contact connected through a high resistance to one of said second pair of terminals of the bridge so to provide for shifting of the center frequency without appreciably affecting the width of the frequency-modulation band.

References Cited in the file of this patent

UNITED STATES PATENTS

| | | |
|---|---|---|
| 2,439,245 | Dunn | Apr. 6, 1948 |
| 2,451,858 | Mork | Oct. 19, 1948 |
| 2,496,148 | Butts | Jan. 31, 1950 |
| 2,509,280 | Sziklai | May 30, 1950 |
| 2,611,873 | Gager | Sept. 23, 1952 |

FOREIGN PATENTS

| | | |
|---|---|---|
| 638,137 | Great Britain | May 31, 1950 |